United States Patent Office 3,763,079
Patented Oct. 2, 1973

3,763,079
POLYURETHANES BASED ON MIXED AROMATIC-ALIPHATIC POLYESTERS
Michael Fryd, Philadelphia, Pa., assignor to E. I. du Pont de Nemours and Company, Wilmington, Del.
No Drawing. Continuation-in-part of abandoned application Ser. No. 102,920, Dec. 30, 1970. This application June 1, 1971, Ser. No. 149,007
Int. Cl. C08g 22/10, 51/04; G11b 11/02
U.S. Cl. 260—37 N          23 Claims

ABSTRACT OF THE DISCLOSURE

A polyester-urethane produced by (A) admixing at least one linear copolyester, such copolyester
  (1) produced by the reaction of one or more diols or polyether glycols with at least two different dicarboxylic acids, anhydrides of dicarboxylic acids, or methyl esters of dicarboxylic acids, about 40–80 mole percent of said dicarboxylic acids, anhydrides of dicarboxylic acids or methyl esters of dicarboxylic acids being aromatic and about 60–20 mole percent of said dicarboxylic acids, anhydrides of dicarboxylic acids or methyl esters of dicarboxylic acids being aliphatic
  (2) having a hydroxyl number of about 20–225
  (3) having a molecular weight of about 500 to about 10,000
  (4) having about two hydroxyl groups per molecule with
(B) at least one organic diisocyanate, the molar ratio of isocyanate contained on the diisocyanate to hydroxyl contained on the copolyester being about 0.7/1.0 to about 1/1, at a temperature and for a time sufficient to form a polyester-urethane.

CROSS REFERENCE TO RELATED APPLICATIONS

This application is a continuation-in-part of United States patent application, Ser. No. 102,920, filed Dec. 30, 1970, and now abandoned.

BACKGROUND OF THE INVENTION

This invention relates to polyester-urethanes that are useful as adhesives, coating compositions, primers, for binding magnetic and/or conductive particles to a suitable support to thereby produce magnetic recording media, and the like.

SUMMARY OF THE INVENTION

A polyester-urethane produced by (A) admixing at least one linear copolyester, such copolyester
  (1) produced by the reaction of one or more diols or polyether glycols with at least two different dicarboxylic acids, anhydrides of dicarboxylic acids, or methyl esters of dicarboxylic acids
  (2) having a hydroxyl number of about 20–225
  (3) having a molecular weight of about 500 to about 10,000
  (4) having about two hydroxyl groups per molecule, with
(B) at least one organic diisocyanate, the molar ratio of isocyanate (contained on the diisocyanate) to hydroxyl (contained on the polyester) being about 7/10 to about 1/1, at a temperature and for a time sufficient to form a polyester-urethane.

There is also provided by this invention a process for adhering materials with the above polyester-urethane, compositions containing the polyester-urethanes, magnetic recording media made with the polyester urethanes and other aspects of the invention which will be described later.

These polyester-urethanes when used as adhesives, provide excellent adhesion to any suitable material and especially to flexible films. As well as this, such polyester-urethanes can be used to make coating compositions, primers, and for binding magnetic and/or conductive particles to a suitable support to thereby produce magnetic recording media.

DESCRIPTION OF THE INVENTION

The copolyesters

The copolyesters are produced by (1) a esterification reaction, i.e. the reaction of one or more diols or polyether glycols with at least two different dicarboxylic acids or two different anhydrides of dicarboxylic acids or (2) by a transesterification reaction, i.e. the reaction of one or more diols or polyether glycols with at least two different esters of dicarboxylic acids.

The copolyesters are produced by conventional techniques which are well known. Ordinarily, the reactants will be admixed in a suitable reaction vessel, with heating to a temperature of about 150° C.–250° C., for ½–8 hours, to produce the polyester.

The diols can be aliphatic or aromatic. The hydrocarbon radicals in the diols can contain, be substituted with or interrupted with non-interfering groups such as N, O, S, halogen and the like. Suitable diols include:

ethylene glycol
propylene-1,2-glycol
propylene-1,3-glycol
butylene-1,3-diol
butylene-1,4-diol
butylene-2,3-diol
neopentylglycol i.e. 2,2-dimethylpropane-1,3-diol
2,2-diethylpropane-1,3-diol
2-methyl-2-propylpropane-1,3-diol
decamethylene glycol
dodecamethylene glycol
thioethylene glycol
N-methyl diethanolamine
monoethyl ether of glycerine
alpha and beta-allyl ethers of glycerol,
and the like.

Preferably the diols will have about 2–8 carbon atoms; most preferably they will have about 2–6 carbon atoms.
A preferred diol is ethylene glycol.

If desired, one or more polyether glycols can be used with the diols. Suitable polyether glycols include polytetramethylene ether glycol, polyethylene glycol, polypropylene glycol, diethylene glycol and the like. Such polyether glycols can have a molecular weight of about 200–10,000, preferably about 500–4,000 and most preferably about 1,000. A preferred polyether glycol is polytetramethylene ether glycol.

The dicarboxylic acids can be aliphatic, cycloaliphatic, unsaturated or aromatic. The hydrocarbon radicals in the dicarboxylic acids can contain, be substituted with, or be interrupted by non-interfering groups such as O, S, N, halogen, keto and the like. Suitable dicarboxylic acids include: malonic, succinic, glutaric, adipic, pimelic, suberic, azelaic, sebacic, brassylic, maleic, fumaric, dilinoleic, diphenic, phthalic, tetrachlorophthalic, isophthalic, terephthalic, orthophthalic acid, cyclohexane dicarboxylic acid, p-phenylene diacetic, naphthalene dicarboxylic acid, dihydromuconic acid, beta-methyl adipic acid, trimethyl adipic acid, ethylether-2,2'-dicarboxylic acid, and the like.

If desired, one can use anhydrides of the above dicarboxylic acids such as phthalic anhydride, tetrahydrophthalic anhydride or the like. A preferred dianhydride is phthalic anhydride.

Preferably, the dicarboxylic acids or anhydrides of dicarboxylic acids will have about 4–12 carbon atoms.

Preferred dicarboxylic acids include terephthalic acid, isophthalic acid, orthophthalic acid, azelaic acid, adipic acid, and a mixture of $C_4$–$C_6$ aliphatic dicarboxylic acids.

Preferably, on a 100 mole percent acid basis, about 40 to about 80 mole percent should be aromatic acid and about 20 to about 60 mole percent should be aliphatic acid. When one or more aromatic acid is used in conjunction with one or more aliphatic acid, preferred acid mixtures contain 0–65 mole percent terephthalic acid, 0–40 mole percent isophthalic acid, 0–60 mole percent orthophthalic acid or phthalic anhydride, 0–60 mole percent adipic acid, 0–60 mole percent azelaic acid and 0–60 mole percent mixed $C_4$–$C_6$ acid, such acids being present in an amount so that the total amount of aromatic acid is about 40 to about 80 mole percent and the total amount of aliphatic acid is about 20 to about 60 mole percent.

The following are especially preferred acid mixtures; such acid mixtures have the mole percent limitations described in the immediately preceding paragraph.

| Designation of acid mixture | Acid or anhydride | Especially preferred (mole percent, 100 mole percent acid basis) | Most especially preferred (mole percent, 100 mole percent acid basis) |
|---|---|---|---|
| A | Terephthalic acid | 28–38 | 33 |
|   | Isophthalic acid | 12–22 | 17 |
|   | Azelaic acid | 40–60 | 50 |
| B | Orthophthalic acid or phthalic anhydride. | 40–60 | 50 |
|   | Adipic acid | 40–60 | 50 |
| C | Terephthalic acid | 45–65 | 55 |
|   | Azelaic acid | 33–55 | 45 |
| D | Terephthalic acid | 35–45 | 40 |
|   | Isophthalic acid | 35–45 | 40 |
|   | Azelaic acid | 5–15 | 10 |
|   | Adipic acid | 5–15 | 10 |
| E | Terephthalic acid | 45–55 | 50 |
|   | Isophthalic acid | 15–25 | 20 |
|   | Azelaic acid | 20–40 | 30 |
| F | Orthophthalic acid or phthalic anhydride. | 40–60 | 50 |
|   | Mixture of $C^4$–$C_6$ aliphatic dicarboxylic acids. | 40–60 | 50 |
| G | Terephthalic acid | 5–15 | 10 |
|   | Orthophthalic acid or phthalic anhydride. | 40–60 | 50 |
|   | Adipic acid | 25–55 | 4 |

In the making of the copolyester, at least two different (a) dicarboxylic acids, (b) anhydrides of dicarboxylic acids, or (c) esters of dicarboxylic acids will be reacted with one or more diols or polyether glycols. Thus, the copolyesters of this invention are to be distinguished from a polyester formed from one dicarboxylic acid, anhydride or dicarboxylic acid or ester of a dicarboxylic acid with one or more diols or polyether glycols.

The copolyester should have about two hydroxyl groups per molecule, that is should be hydroxyl terminated, and should have a hydroxyl number of about 20–225, preferably 40–225, and most preferably about 40–60.

Ordinarily, the copolyester will have a molerular weight of about 500 to about 10,000, preferably about 1,500–4,000 and most preferably about 1,500–3,000.

The diisocyanates

The diisocyanates for use in this invention can be aliphatic or aromatic. Suitable isocyanates include:

hexane-1,6-diisocyanate
decane-1,10-diisocyanate
diisocyanates derived from dimerized fatty acids
phenylene-1,4-diisocyanate
toluene-2,4-diisocyanate
toluene-2,6-diisocyanate
naphthylene-1,5-diisocyanate
diphenylmethane-4,4'-diisocyanate
diphenylmethane-3,3'-dimethoxy-4,4'-diisocyanate
dicyclohexylmethane-4,4'-diisocyanate, etc.

Preferred is toluene-2,4-diisocyanate, toluene-2,6-diisocyanate or mixtures thereof.

The solvents

It is often desirable to have the reaction between the copolyester and the diisocyanate take place in the presence of an inert organic solvent. Suitable solvents include aromatic hydrocarbons such as toluene, xylene, tetrahydronaphthalene, decahydronaphthalene, etc.; chlorinated hydrocarbons such as methylene chloride, chloroform, dichloroethane, trichloroethane; ethers such as diisopropyl ether, tetrahydrofuran, dioxane, ethylene glycol dimethyl ether, etc.; esters such as ethyl acetate, butyl acetate, etc.; ketones such as acetone, methyl ethyl ketone, methyl isobutyl ketone, cyclohexanone, etc.

The process

The polyester-urethane is prepared by admixing copolyester, diisocyanate, and if desired, organic liquid solvent in a suitable reaction vessel at a temperature and for a time sufficient for the polyester-urethane to be formed. If desired, a catalyst may be used such as trimethylpyridine, N-ethyl morpholine, diazabicyclo-(2,2,2)-octane or organic metal compounds (for example dibutyl tin dilaurate).

The reaction time can vary somewhat depending upon the reactivity of the diisocyanate used and whether or not a catalyst is used. Generally, however, the reaction time will be between about ¼ and 8 hours. The reaction temperature can be between about 40° C. and 180° °C.

The molar ratio of isocyanate (contained on the diisocyanate) to hydroxyl (contained on the above-described copolyester) should be about 0.7/1.0 to about 1.0/1.0, preferably 0.75/1.0 to .90/1.0 and most preferably 0.80/1.0 to 0.85/1.0. Because of this ratio of isocyanate to hydroxyl, the polyester-urethane will contain little or no free isocyanate groups. Preferably, the polyester-urethane will have a molecular weight of about 5,000 to about 28,000 and more preferably about 7,000 to about 14,000.

Utility; compositions

The polyester-urethanes of this invention can be used as adhesives, coating compositions, primers and for binding magnetic and/or conductive particles to a suitable support to thereby produce magnetic recording media and the like.

Any suitable materials can be adhered with the polyester-urethanes of this invention including paper, wood, cellulose, polyester including polyterephthalate, polypropylene, polyethylene, polyvinyl chloride copolymers of vinyidene chloride and vinyl chloride, vinyl acetate and copolymers of vinyl acetate with other free radical-polymerizable monomers, polyamides, flexible films, including those made from any of the foregoing that are suitable for making flexible films, metal foils, rubber, and the like. Of course, the same materials or different materials can be adhered to each other.

Ordinarily, the process for adhering materials will comprise:

(1) applying the polyester-urethane to the surface of material,
(2) placing another material in contact with the polyester-urethane that has been applied to the material described in (1).

If desired, a third step in the above process can be the application of heat, pressure or heat and pressure.

The polyester-urethane can be applied to materials from a solution containing about 0.5–60%, preferably about 20% to about 60% by weight polyester-urethane. The solutions of the polyester-urethane in its reaction media can be used directly, preferably after adjusting the percent solids, if necessary, by the evaporation of existing solvent or addition of more solvent. After the solution of polyester-urethane is applied to material, the solvent is then removed.

If the polyester-urethane of this invention is to be used as an adhesive, adjuncts such as inert high molecular weight compounds such as polyvinyl chloride, polyvinyl acetate and the like can be added to the adhesive solutions.

If the polyester-urethanes are to be used as coating compositions, adjuncts such as pigments, fillers, plasticizers and the like can be added to them. Examples of suitable pigment include titanium dioxide, iron oxide, lead chromate, chromium oxide, phthalocyanines, carbon black, zinc oxide, magnesium oxide, antimony oxide, lithopone, zinc chromate, red lead, aluminum (powder or flake), zinc stearate, aluminum stearate, glass microbubbles, aluminum silicate, magnesium silicate, calcium sulfate, barium sulfate, silicon dioxide, potassium aluminum silicate, calcium carbonate, magnesium silicate, calcium silicate, amorphous silica, mica, bentonite, asbestos, particles of polymer that has a high enough glass transition point so that they do not significantly coalesce at the prevalent drying conditions.

Pigment can be present in an amount at or up to the critical pigment volume (that level of pigmentation in a dry paint film where just sufficient binder is present to fill the voids between the pigment particles). Often pigment will be present in an amount of about 0.5% to about 60% by volume (based on combined volume of the pigment and the film-forming polymer).

The polyester-urethanes can be used as binders for magnetic recording media. For this utility the polyester-urethanes can be blended with certain pigments such as magnetic and/or conductive particles, solvent (such as those previously enumerated) and if desired particle dispersant. Any suitable mixing means can be used such as sand-grinding, ball milling, high speed mixing and the like.

Suitable magnetic particles include magnetic iron oxide, chromium dioxide, ferritic materials having the composition $MeFe_2O_4$ where Me is a divalent transitional metal ion, such as $Mn^{++}$, $Fe^{++}$, $Ni^{++}$, $Co^{++}$, $Cu^{++}$, $Zn^{++}$, $Cd^{++}$, or $Mg^{++}$ or mixtures thereof.

Suitable non-magnetic conductive particles include carbon particles, and more particularly, carbon black, graphite or mixtures thereof. Other non-magnetic conductive particles can be used also.

Ordinarily, the magnetic particles and/or nonmagnetic conductive particles will be present in an amount of about 6.5–80%, preferably 20–70% by weight, based on the total weight of the polyester-urethane.

Suitable particle dispersants include organic materials of the amphoteric types, such as soya lecithin and organic materials that can be anionic, cationic or nonionic, such as polymers of about 12–18 carbon atoms containing —OH or —COOH functionality (for example, stearic acid), sodium lauryl sulfate and dioctyl sodium sulfosuccinate. Preferred particle dispersants are the polyesters bearing polyethyleneimine terminal groups described in United States patent application, Ser. No. 776,774, filed Nov. 18, 1968, in the name of D. R. Thompson, and now abandoned and the pending continuation-in-part thereof having Ser. No. 120,773, filed Mar. 3, 1971, the disclosures of which are hereby incorporated by reference. The polyesters bearing polyethyleneimine terminal groups are represented by the structure:

(1)
$$R_2-N\begin{bmatrix} R_1 \\ \end{bmatrix}\begin{bmatrix} R_3 \\ CH-CH_2-N \end{bmatrix}_a \begin{bmatrix} R_4 \\ \end{bmatrix} Z_b-B$$

where $R_1$, $R_2$ and $R_4$ can be hydrogen, alkyl radicals of 1 through 4 carbon atoms, —$CH_2CH_2NH_2$, or —$CH_2CH_2OH$;

$R_3$ can be hydrogen or an alkyl radical of 1 through 4 carbon atoms;

$Z_b$ can be an organic linking radical;

B can be $$-\begin{bmatrix} O-X-\overset{O}{\underset{\|}{C}} \end{bmatrix}_n -OD$$

$$-\begin{bmatrix} \overset{O}{\underset{\|}{C}}-X-O \end{bmatrix}_n \overset{O}{\underset{\|}{C}}-D$$

$$-\begin{bmatrix} O-Y-O-\overset{O}{\underset{\|}{C}}-X-\overset{O}{\underset{\|}{C}} \end{bmatrix}_n -OD$$

or $$-\begin{bmatrix} \overset{O}{\underset{\|}{C}}-X-\overset{O}{\underset{\|}{C}}-O-Y-O \end{bmatrix}_n \overset{O}{\underset{\|}{C}}-D$$

where

X can be an alkylene radical of 2 through 18 carbon atoms or phenylene;

Y can be an alkylene radical of 2 through 18 carbon atoms;

D can be phenyl or a straight or branched chain alkyl radical of 1 through 18 carbon atoms; and $n$ is a number 10 through 500;

$a$ is a number 1 through 2000; and $b$ is 0 or 1;

the $n/a$ quotient being greater than 1.

Preferred are those of Formula 1 where D is a straight or branched chain alkyl radical of 3 through 12 carbon atoms, $n$ is a number 20 through 200, $a$ is a number 3 through 500 and $b$ is 1. Especially preferred is that having the structure:

$$HN-\begin{bmatrix}H \\ CH_2CH_2N\end{bmatrix}_3 \overset{O}{\underset{\|}{C}}-NH-\underset{CH_3}{\bigcirc}-NH\overset{O}{\underset{\|}{C}}-\begin{bmatrix}O-(CH_2)_5-\overset{O}{\underset{\|}{C}}\end{bmatrix}_{\sim 20} O-(CH_2)_3-CH_3$$

Ordinarily, the particle dispersant will be present in the following amounts based on the total weight of the polyester-urethane: generally, about 0.5%–25%, preferably, about 3–15% and most preferably, about 5–10%.

PREPARATION OF THE ANTI-FLOCCULATING AGENTS

Preparation of the anti-flocculating agents can be more easily shown if it is first explained that structurally the molecule divides itself naturally into two or three segments.

The first of these, the B segment, is derived from a polyester.

The second, the —$Z_b$— segment, is an organic linking radical (which may be absent) which serves only to link the other two segments of the molecule together.

The third, the

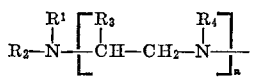

segment, is derived from a polyethyleneimine.

The precursors of these segments are separately prepared and then linked together by reacting them under appropriate conditions.

(A) Preparation of the polyester

This precursor can be prepared by any of the well-known polyester-forming reactions. Illustrative of these are (1) Polymerization of lactones such as propiolactone, caprolactone and pivalolactone.
(2) Condensation of hydroxy acids such as $\alpha,\omega$-hydroxypropionic acid, $\alpha,\omega$-hydroxydecanoic acid and 12-hydroxystearic acid.
(3) Condensation of glycol and dicarboxylic acid systems such as ethylene glycol/decamethylene dicarboxylic acid, hexamethylene glycol/succinic acid and 2,2-bis-hydroxymethylpropane/adipic acid.

The formation of polyesters capped at both ends with hydroxyl groups should be minimized. This can be done by controlling the stoichiometry of the reaction so that the acid number and the hydroxyl number of the polyester are approximately equal.

(4) Polymerization of epoxides with cyclic acid anhydrides in the presence of excess epoxides.

These reactions, as well as others, are described in greated detail in "Preparative Methods of Polymer Chemistry," Sorenson and Campbell, Interscience Publishers, Inc., New York, N.Y. (1961), pp. 111–127 and 242–247 and "Polyesters and Their Applications, Bjorksten Research Laboratories, Inc., Reinhold Publishing Corp., New York, N.Y. (1956).

(B) Preparation of the polyethylenimine segment

Some of the polyethylenimines are available commercially and can be used directly, without processing. Those polyethylenimines which cannot be obtained commercially can be prepared according to the general equation

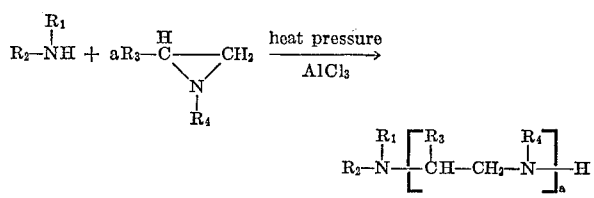

where $R_1$, $R_2$, $R_3$, $R_4$ and $a$ are as in Formula 1.

(C) Linking the polyester to the polyethylenimine

The polymers of the invention are made by coupling together the previously prepared polyester and polyethylenimine. If the terminal functional group on the polyester can react directly with the polyethylenimine, they can be coupled together by simply mixing stoichiometric amounts of each in a vessel and then heating them at a temperature of 0° C. to 120° C. for from ½ to 4 hours.

If the functional group on the polyester cannot react directly with the polyethylenimine, either may be modified by reacting it with a stoichiometric amount of an appropriate difunctional compound so that it will react. Preferably the polyester is so modified.

Illustrative of such a reaction (which will introduce a —$Z_b$— linking radical into the final molecule) are

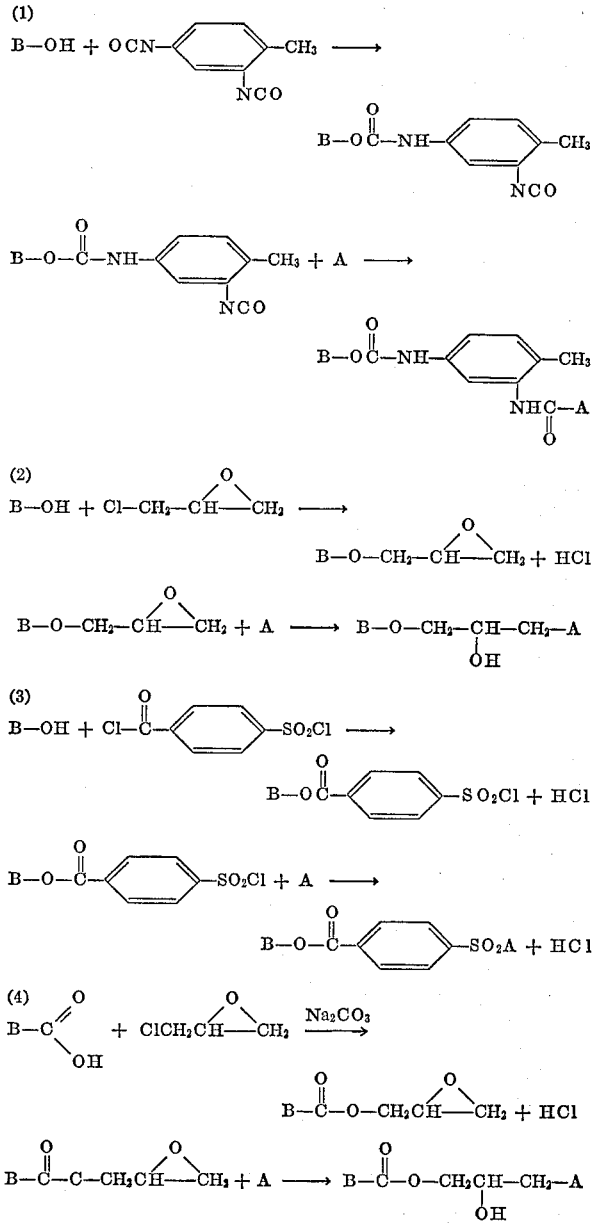

In these equations, A signifies the polyethylenimine segment and B signifies the polyester segment.

After one of the precursors has been reacted with the linking compound, the product and the other precursor are dissolved in a mutual solvent such as toluene and refluxed for from 1 to 8 hours.

These polymers can be isolated from the reaction mass by adding a non-solvent such as methanol. The resulting precipitate is then filtered off and purified by redissolving and precipitating it several times, and then drying it at 60–100° C. in an inert atmosphere.

The blend of polyester-urethane, magnetic and/or conductive particles, organic liquid solvent, and if desired particle dispersant can be applied to a suitable support by any suitable method, such as by dipping, brushing, spraying, doctor-blading and the like. Afterwards, it is cured, preferably by the application of heat for a short period of time. Such compositions can contain about 0.5–60% polymer solids and preferably, about 15–45% polymer solids. Often the film produced by curing such compositions on a suitable support will have a thickness of about 0.1–1.5 mils, preferably about 0.5 mil.

Suitable supports may be in the form of a tape, belt, disk or the like. The support can be made from any suitable material including polyesters, such as polyethylene terephthalate, polyvinyl chloride, cellulose acetate, metal, such as copper, brass, aluminum, tin, and the like. Preferred is polyethylene terephthalate, especially that which has been biaxially symmetrically or asymmetrically stretched. Especially preferred is the polyethylene terephthalate described in U.S. Pat. No. 3,397,072, the disclosure of which is hereby incorporated by reference.

The following examples illustrate the invention; all parts and percentages are by weight unless otherwise specified.

EXAMPLE 1

783.3 grams of terephthalic acid, 403.5 grams of isophthalic acid, 1358.7 grams of azelaic acid and 1241.4 grams of ethylene glycol were loaded into a 5 liter three neck flask equipped with a packed distillation column, heating means and agitation means. This mixture was heated at atmospheric pressure to 225° C. taking off the water of reaction and minor amounts of ethylene glycol.

At 225° C. the packed distillation column was removed, the flask was equipped with a condenser, a receiver, an ice trap and a vacuum pump. The heating was continued to 240° C. and the pressure was gradually reduced to 25 millimeters Hg absolute. These conditions were held until the hydroxyl terminated copolyester had a hydroxyl number of 50.4 through removal of ethylene glycol; the molecular weight of the copolyester, calculated from the hydroxyl number, was about 2226. An acid number of less than 2.0 was attained showing the esterification reaction was essentially completed.

The heat was turned off and the hydroxyl terminated copolyester was cooled to room temperature. 600 grams of the hydroxyl terminated copolyester were loaded into a 2 liter 3 neck flask. 423.9 grams of methyl isobutyl ketone were added and a condenser and water separator filled with methyl isobutyl ketone were placed in the flask. Heat and agitation were applied until reflux of 122° C. was reached. The batch was held at reflux to remove any water present for 30 minutes at which time the heat was turned off.

The water separator was removed and replaced by a straight tube allowing the refluxing solvent to flow directly back into the flask. At this point 37.6 grams of "Hylene TM" (a mixture of 80% 2,4-toluene diisocyanate and 20% toluene 2,6-diisocyanate available from E. I. du Pont de Nemours and Company) and 1.2 grams of trimethylpyridine catalyst were added in sequence. The molar ratio of isocyanate to hydroxyl was about 0.8/1.0.

The heat was applied again and reflux attained. The reaction was held for 4 hours and then the heat was removed. The resulting polyester-urethane had a hydroxyl number of 15.9 and a molecular weight (calculated from the hydroxyl number) of about 7057.

The resulting polyester-urethane was thinned to 40% solids by adding 531.3 grams of methyl ethyl ketone. The polyester-urethane solution was applied to a film of "Mylar" polyester film by drawdown with a wire wound rod, the solvent removed and laminated to another "Mylar" polyester film using a "Sentinel" heat sealer. The "Mylar" polyester films were found to have excellent adhesion to each other.

EXAMPLE 2

A polyester-urethane was produced using the procedure of Example 1. 1304.00 grams of phthalic anhydride, 1286.38 grams of adipic acid and 1215.01 grams of ethylene glycol were reacted to produce a hydroxyl terminated copolyester having a hydroxyl number of 49.7 and a molecular weight (calculated from the hydroxyl number) of about 2258.

928.1 grams of the hydroxyl terminated copolyester were admixed with 270.9 grams of methyl isobutyl ketone. This mixture was dried and 24.7 grams of additional methyl isobutyl ketone was removed to assure anhydrous conditions. To this mixture 0.6 gram of N-ethyl morpholine and 58.9 grams of "Hylene TM" mixture of 2,4- and 2,6-toluene diisocyanate were admixed and reacted. The molar ratio of isocyanate to hydroxyl was about 0.8/1.0. The resulting polyester-urethane had a hydroxyl number of 14.2 and a molecular weight (calculated from the hydroxyl number) of about 7901.

Solids were reduced to 60% by adding 411.2 grams methyl ethyl ketone and adhesion was tested as in Example 1. Excellent adhesion was obtained.

EXAMPLE 3

A polyester-urethane was produced using the procedure of Example 1. 872 grams terephthalic acid, 816.6 grams azelaic acid and 740.2 grams ethylene glycol were reacted to produce a hydroxyl terminated copolyester having a hydroxyl number of 36.2 and a molecular weight (calculated from the hydroxyl number) of about 3099.

The hydroxyl terminated copolyester is reduced to 60% solids by the addition of 1,1,2-trichloroethane.

500 grams of the reduced solution of hydroxyl terminated copolyester were dried as in Example 1. To the dried solution, 0.6 gram trimethylpyridine and 16.0 grams "Hylene TM" mixture of 2,4- and 2,6-toluene diisocyanate were added followed by application of heat to produce reflux for 3 hours to produce a polyester-urethane. The molar ratio of isocyanate to hydroxyl was about 0.95/1.0. The polyester-urethane had a hydroxyl number of 6.4 and a molecular weight (calculated from the hydroxyl number) of about 17,531.

The polyester-urethane was reduced to 15% solids by adding 1316.7 grams of 1,1,2-trichloroethane and tested for adhesion as in Example 1. Excellent adhesion was obtained.

EXAMPLE 4

A polyester-urethane was produced using the procedure of Example 1. 1006.7 grams terephthalic acid, 1006.7 grams isophthalic acid, 288.1 grams azelaic acid, 221.4 grams adipic acid and 1175.1 grams ethylene glycol were reacted to produce a hydroxyl terminated copolyester having a hydroxyl number of 65.5 and a molecular weight (calculated from the hydroxyl number) of about 1713.

150 grams of the hydroxyl terminated copolyester were mixed with 120 grams toluol, dried removing 10 grams toluol and reacted for 45 minutes with 15.2 grams "Hylene TM" mixture of 2,4- and 2,6-toluene diisocyanate using 0.3 gram trimethylpyridine catalyst. The molar ratio of isocyanate to hydroxyl was about 1.0/1.0. The resulting polyester-urethane had a hydroxyl number of 6.1 and a molecular weight (calculated from the hydroxyl number) of about 18,393.

The polyester-urethane was thinned to 20% solids with 456.9 grams methyl ethyl ketone and 86.5 grams toluol. When tested for adhesion as in Example 1, excellent results were obtained.

EXAMPLE 5

A polyester-urethane was produced using the procedure of Example 1. 826.8 grams terephthalic acid, 330.9 grams isophthalic acid, 567.9 grams azelaic acid, 980.1 grams polytetramethylene ether glycol and 772.2 grams ethylene glycol were reacted to produce a hydroxyl terminated copolyester having a hydroxyl number of 54.5 and a molecular weight (calculated from the hydroxyl number) of about 2059.

600.0 grams of the hydroxyl terminated copolyester were reduced with 520.4 grams toluol, dried removing 86.8 grams of toluol and reacted for 2 hours with 50.8 grams "Hylene TM" mixture of 2,4- and 2,6-toluene diisocyanate using 1.2 grams trimethyl-pyridine catalyst. The molar ratio of isocyanate to hydroxyl was about 1.0/1.0. The resulting polyester-urethane had a hydroxyl number of 11.2 and a molecular weight (calculated from the hydroxyl number) of about 10,018.

The polyester-urethane was thinned to 40% solids with 544.0 grams methyl ethyl ketone. When tested for adhesion as in Example 1, excellent results were obtained.

tered off and dried in a vacuum at 60° C. Its structure was

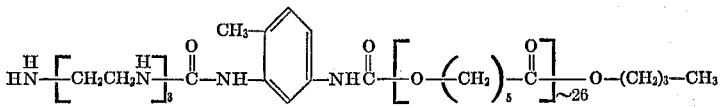

EXAMPLE 6

A polyester-urethane was produced using the procedure of Example 1. 592 grams phthalic anhydride, 632 grams C₄–C₆ mixed aliphatic dicarboxylic acid and 620 grams ethylene glycol were reacted to produce a hydroxyl terminated copolyester having a hydroxyl number of 25.3 and a molecular weight (calculated from the hydroxyl number) of about 4435.

465.7 grams of the hydroxyl terminated copolyester were mixed and dried with 146.7 grams of methyl isobutyl ketone removing 12.1 grams of the methyl isobutyl ketone. This solution of polyester was reacted with 14.4 grams of "Hylene TM" mixture of 2,4- and 2,6-toluene diisocyanate for 4 hours using 0.14 gram of N-ethyl morpholine catalyst. The molar ratio of isocyanate to hydroxyl was about 0.8/1.0. The resulting polyester-urethane had a hydroxyl number of 7.6 and a molecular weight (calculated from the hydroxyl number) of about 14,763.

The polyester-urethane was thinned to 60% solids with 185.36 grams methyl ethyl ketone. When tested for adhesion as in Example 1, excellent results were obtained.

EXAMPLE 7

A polyester-urethane was produced using the procedure of Example 1. 289.4 grams terephthalic acid, 1290.6 grams phthalic anhydride, 1018.4 grams adipic acid and 1357.7 grams ethylene glycol were reacted to produce a hydroxyl terminated copolyester having a hydroxyl number of 33.2 and a molecular weight (calculated from the hydroxyl number) of about 3380.

900 grams of the hydroxyl terminated copolyester and 257.04 grams of methyl isobutyl ketone were mixed followed by drying to remove 23.4 grams methyl isobutyl ketone in the process.

The dried solution of the polyester was reacted with 36.9 grams "Hylene TM" mixture of 2,4- and 2,6-toluene diisocyanate for 4 hours using 0.36 grams triethylamine as the catalyst. The molar ratio of isocyanate to hydroxyl was about 0.8/1.0. The resulting polyester-urethane had a hydroxyl number of 9.0 and a molecular weight (calculated from the hydroxyl number) of about 12467.

The polyester-urethane was thinned to 60% solids with 390.6 grams methyl ethyl ketone and tested for adhesion as in Example 1. Excellent results were obtained.

EXAMPLE 8

The polyester-urethanes of Examples 1–7 can be reduced to suitable solids, pigmented if desired, and admixed with dispersing agents as required to produce coating compositions. These coating compositions can be used to coat suitable substrates.

EXAMPLE 9

(A) Preparation of particle dispersant

A solution of 200 parts of polycaprolactone (molecular weight 3000) in 465 parts of benzene was added dropwise over a two-hour period to a refluxing solution of 11.6 parts of 2,4-toluene diisocyanate and 0.13 part dibutyl tin dilaurate in 100 parts of benzene.

The solution was refluxed for 30 minutes, cooled and 388 parts were added to 10 parts of triethylene tetramine (molecular weight 600) in 50 parts of dimethylformamide.

The mixture was stirred for 1 hour at room temperature and then precipitated in methanol. The polymer was filtered off and dried in a vacuum at 60° C. Its structure was (B) Preparation of binder composition (1) A solution was prepared of 24 parts of the hydroxyl terminated polyester urethane of Example 1 and 2.5 parts of the particle dispersant above-described in (A) in 88.5 parts of a 70/15/10/5 cyclohexanone, methylethyl ketone, methylisobutyl ketone, toluene mixture.

(2) A thin slurry of 66 parts of iron oxide (magnetic tape grade) and 4 parts of conductive carbon in a small amount of the solution in (1) was ball-milled for 24 hours.

(3) The remainder of the solution in (1) was then added to the slurry in (2). The mixture was ball-milled for 2 hours.

The resulting dispersion can be doctor-bladed on a sheet of "Mylar" polyester film followed by baking at about 100° C. for one minute to produce a magnetic tape having good adhesion of the coating to the substrate and good electrical properties.

The invention claimed is:

1. A polyester-urethane produced by (A) admixing at least one linear copolyester, such copolyester.
   (1) produced by the reaction of one or more diols or polyether glycols with at least two different dicarboxylic acids, anhydrides of dicarboxylic acids, or methyl esters of dicarboxylic acids, about 40–80 mole percent of said dicarboxylic acids, anhydrides of dicarboxylic acids or methyl esters of dicarboxylic acids being aromatic and about 60–20 mole percent of said dicarboxylic acids, anhydrides of dicarboxylic acids or methyl esters of dicarboxylic acids being aliphatic said aromatic components being selected from the group consisting essentially of terephthalic acid, isophthalic acid, orthophthalic acid, phthalic anhydride and mixtures thereof and said aliphatic components being selected from the group consisting of succinic acid, glutaric acid, adipic azelaic acid, pimelic, suberic, sebacic acid and mixtures thereof,
   (2) having a hydroxyl number of about 20–225
   (3) having a molecular weight of about 500 to about 10,000
   (4) having about two hydroxyl groups per molecule with
(B) at least one organic diisocyanate, the molar ratio of isocyanate contained on the diisocyanate or hydroxyl contained on the copolyester being about 0.7/1.0 to about 1/1, at a temperature and for a time sufficient to form a polyester-urethane.

2. The polyester-urethane of claim 1 wherein the molar ratio of isocyanate contained on the diisocyanate to hydroxyl contained on the copolyester is about 0.75/1.0 to about .90/1.0.

3. The polyeester-urethane of claim 1 wherein the molar ratio of isocyanate contained on the diisocyanate to hydroxyl contained on the copolyester is about 0.80/1.0 to about 0.85/1.0.

4. The polyester-urethane of claim 1 wherein the organic diisocyanate is a mixture of toluene-2,4-diisocyanate and toluene-2,6-diisocyanate.

5. The polyester-urethane of claim 1 having a molecular weight of about 5,000 to about 28,000.

6. The polyester-urethane of claim 1 wherein the copolyester has a hydroxyl number of about 40 to about 225 and a molecular weight of about 1800 to about 10,000.

7. The polyester-urethane of claim 1 wherein the copolyester has a hydroxyl number of about 40 to about 60 and a molecular weight of about 1800 to about 2800.

8. The polyester-urethane of claim 1 wherein said copolyester is produced from the reaction of ethylene glycol, polytetramethylene ether glycol or mixtures thereof with at least two different dicarboxylic acids or anhydrides of dicarboxylic acids selected from the group consisting of terephthalic acid, isophthalic acid, orthophthalic acid, phthalic anhydride, azelaic acid, adipic acid and mixture of $C_4$-$C_6$ aliphatic dicarboxylic acid.

9. The polyester-urethane of claim 1 wherein the copolyester is produced from acid mixtures selected from the following groups (A)-(G):
(A) terephthalic acid 28-38 mole percent, isophthalic acid 12-22 mole percent and azelaic acid 40-60 mole percent,
(B) orthophthalic acid or phthalic anhydride 40-60 mole percent and adipic acid 40-60 mole percent,
(C) terephthalic acid 45-65 mole percent and azelaic acid 35-55 mole percent,
(D) terephthalic acid 35-45 mole percent, isophthalic acid 35-45 mole percent, azelaic acid 5-15 mole percent and adipic acid 5-15 mole percent,
(E) terephthalic acid 45-55 mole percent, isophthalic acid 15-25 mole percent and azelaic acid 20-40 mole percent,
(F) orthophthalic acid or phthalic anhydride 40-60 mole percent and mixtures of $C_4$-$C_6$ aliphatic dicarboxylic acids 40-60 mole percent, and
(G) terephthalic acid 5-15, orthophthalic acid or phthalic anhydride 40-60 mole percent and adipic acid 25-55 mole percent.

10. The polyester-urethane of claim 1 wherein the copolyester is produced from acid mixtures selected from the following groups (A)-(G):
(A) terephthalic acid 33 mole percent, isophthalic acid 17 mole percent, and azelaic acid 50 mole percent,
(B) orthophthalic acid or phthalic anhydride 50 mole percent and adipic acid 50 mole percent,
(C) terephthalic acid 55 mole percent and azelaic acid 45 mole percent,
(D) terephthalic acid 40 mole percent, isophthalic acid 40 mole percent, azelaic acid 10 mole percent and adipic acid 10 mole percent,
(E) terephthalic acid 50 mole percent, isophthalic acid 20 mole percent and azelaic acid 30 mole percent,
(F) orthophthalic acid or phthalic anhydride 50 mole percent, and mixtures of $C_4$-$C_6$ aliphatic dicarboxylic acids 50 mole percent,
(G) terephthalic acid 10 mole percent, orthophthalic acid or phthalic anhydride 50 mole percent and adipic acid 40 mole percent.

11. The polyester-urethane of claim 9 wherein the copolyester is produced from ethylene glycol, polytetramethylene ether glycol or mixtures thereof.

12. The polyester-urethane of claim 1 wherein the molar ratio of isocyanate contained on the diisocyanate to hydroxyl contained on the copolyester is about 0.80/1.0 to about 0.85/1.0, the organic diisocyanate is a mixture of toluene-2,4-diisocyanate and toluene-2,6-diisocyanate, the polyester has a hydroxyl number of about 40 to about 60, and the polyester is produced from the reaction of ethylene glycol, polytetramethylene ether glycol or mixtures thereof with at least two different dicarboxylic acids selected from the groups consisting of terephthalic acid, isophthalic acid, orthophthalic acid, phthalic anhydride, azelaic acid, adipic acid and mixtures of $C_4$-$C_6$ aliphatic dicarboxylic acid.

13. The polyester-urethane of claim 10 wherein the copolyester is produced from ethylene glycol, polytetramethylene ether glycol or mixtures thereof.

14. The polyester-urethane of claim 9 wherein the molar ratio of isocyanate contained on the diisocyanate to hydroxyl contained on the copolyester is about 0.80/1.0 to about 0.85/1.0, the organic diisocyanate is a mixture of toluene 2,4-diisocyanate and toluene-2,6-diisocyanate, and the polyester has a hydroxyl number of about 40 to about 60.

15. The polyester-urethane of claim 10 wherein the molar ratio of isocyanate contained on the diisocyanate to hydroxyl contained on the copolyester is about 0.80/1.0 to about 0.85,/1.0, the organic diisocyanate is a mixture of toluene 2,4-diisocyanate and toluene-2,6-diisocyanate, and the polyester has a hydroxyl number of about 40 to about 60.

16. The polyester-urethane of claim 1 contained in organic liquid solvent.

17. The polyester-urethane of claim 12 contained in organic liquid solvent.

18. The composition of claim 16 containing about 0.5-25% by weight, based on the weight of the polyester-urethane, of particle dispersant.

19. The composition of claim 16 containing about 0.5-25% by weight, based on the weight of the polyesterurethane, of a particle dispersant having the formula:

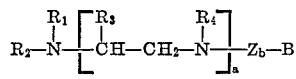

where
$R_1$, $R_2$ and $R_4$ are hydrogen, alkyl radicals of 1 through 4 carbon atoms, —$CH_2CH_2NH_2$, or —$CH_2CH_2OH$;
$R_3$ is hydrogen or an alkyl radical of 1 through 4 carbon atoms;
$Z_b$ is an organic linking radical;
B is

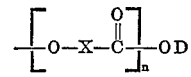

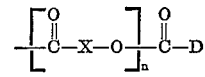

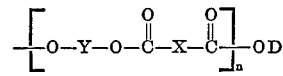

or

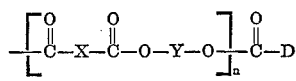

where
X is an alkylene radical radical of 2 through 18 carbon atoms or phenylene;
Y is an alkylene radical of 2 through 18 carbon atoms;
D is phenyl or a straight or branched chain alkyl radical of 1 through 18 carbon atoms; and
$n$ is a number 10 through 500;
$a$ is a number 1 through 2000; and
$b$ is 0 or 1;
the $n/a$ quotient being greater than 1.

20. The composition of claim 19 wherein the particle dispersant has the formula:

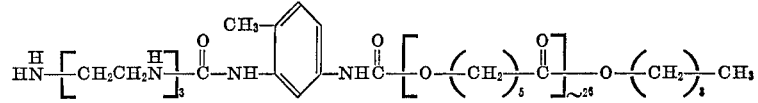

21. The composition of claim 19 containing about 6.5–80% by weight based on the total weight of the polyester-urethane of magnetic and/or conductive particles.

22. Article comprising a support and adhered to the support a layer of polyester-urethane, said polyester-urethane containing about 0.5–25% by weight based on the weight of the polyester-urethane of the particle dispersant described in claim 19, and about 6.5–80% by weight based on the weight of the polyester-urethane of magnetic and/or conductive particles.

23. Composition of claim 16 containing pigment.

References Cited
UNITED STATES PATENTS

| | | | |
|---|---|---|---|
| 2,650,212 | 8/1953 | Windemuth | 260—75 |
| 2,801,648 | 8/1957 | Anderson et al. | 138—74 |
| 3,202,728 | 8/1965 | Kohn | 260—858 |
| 3,238,056 | 3/1966 | Pall et al. | 117—98 |
| 3,255,069 | 6/1966 | Crowley | 161—190 |
| 3,384,506 | 5/1968 | Elkin | 117—62 |
| 2,929,800 | 3/1960 | Hill | 260—77.5 |
| 3,079,350 | 2/1963 | Bernstein | 260—2.5 |
| 3,170,833 | 2/1965 | Noyes | 161—186 |
| 3,341,498 | 9/1967 | Skreckoski et al. | 260—75 |
| 3,554,951 | 1/1971 | Blomeyer et al. | 260—29.1 |
| 3,574,684 | 4/1971 | Higashi | 117—237 |
| 3,574,048 | 4/1971 | Klimisch | 260—75 NK |

DONALD E. CZAJA, Primary Examiner

H. S. COCKER, Assistant Examiner

U.S. Cl. X.R.

117—226, 235; 161—190 KP; 260—37 M, 37 P, 75 NK, 858

PO-1050
(5/69)

UNITED STATES PATENT OFFICE
CERTIFICATE OF CORRECTION

Patent No. 3,763,079         Dated  October 2, 1973

Inventor(s)  Michael Fryd

It is certified that error appears in the above-identified patent and that said Letters Patent are hereby corrected as shown below:

Column 12, line 29, delete the period [.] after "copolyester".

Column 12, line 51, after "diisocyanate" delete "or" and insert -- to --.

Column 12, line 59, "polyeester" should be -- polyester --.

Column 13, line 64, between "acids" and "selected" insert -- or anhydrides of dicarboxylic acids --.

Column 14, line 11, delete the comma [,] after "0.85".

Column 14, lines 23-24, "polyesterurethane" should be -- polyester-urethane --.

Signed and sealed this 26th day of February 1974.

(SEAL)
Attest:

EDWARD M. FLETCHER, JR.           C. MARSHALL DANN
Attesting Officer                  Commissioner of Patents